BEST AVAILABLE COPY
J. Bouis
Cooking Stove.
1,860 X
Patented Dec. 31, 1812
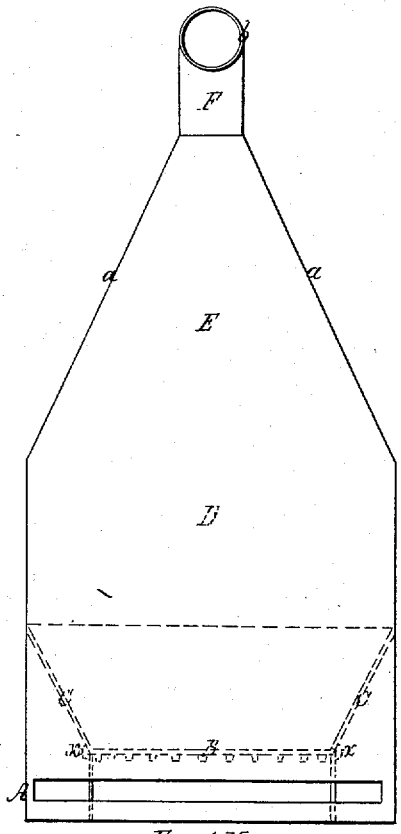
Front View
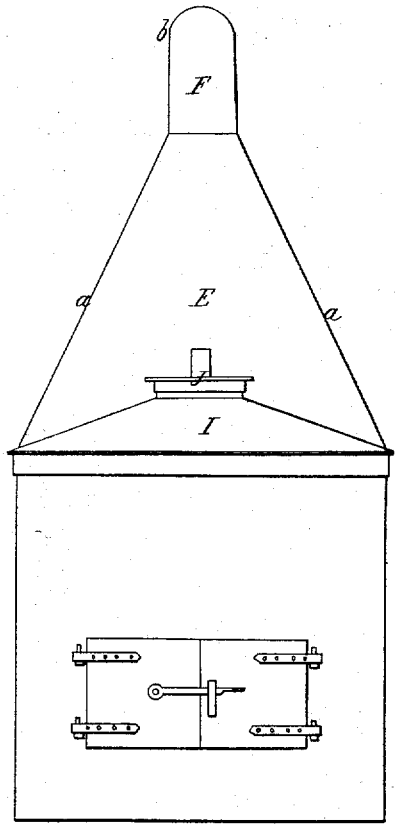
Back View
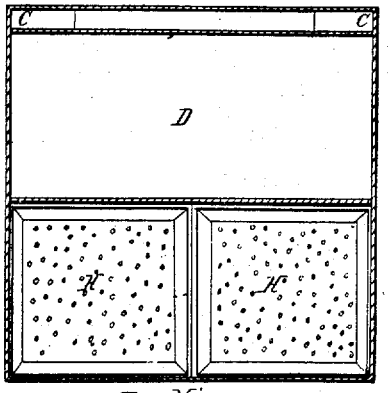
Top View
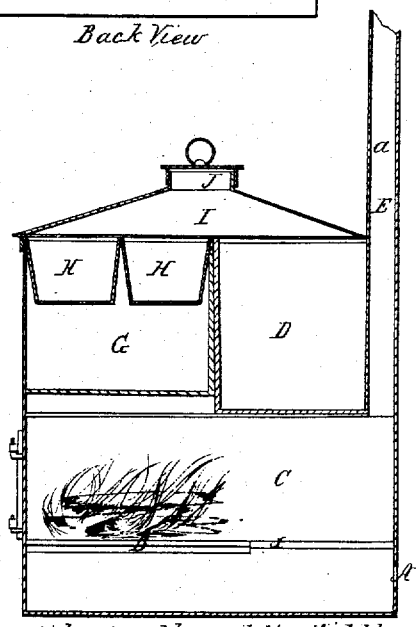
Side view through the Middle.
N. PETERS, PHOTO-LITHOGRAPHER, WASHINGTON, D. C.

1860X

John Bovis
Letters Patent

The schedule referred to in these Letters patent and making part of
the same containing a description in the words of the said John Bovi
himself of his improved Caboose -

The general form of the Caboose is square like others, but the front is
closed except near the bottom where there is an opening the whole length of
the front & of a sufficient height which communicates to the grate or fire
on each side of the bottom where the fire is, are two cheeks of cast iron.
made in a form sloaping towards the centre of the grate that is placed
between them the sides resting in the lower parts of the above mentioned
sloaping cheeks, said cheeks being hollow prevent the heat of the fire from
communicating to any part of the vessel near the Caboose and the space
between is occupied by a grate of sufficient length. Immediately over said
opening in front of the Caboose is the oven, projecting inwards and over
the fire, of a sufficient size immediately over the oven is the mouth of
the flue which occupies the space of the whole front of the caboose -
formed by a double plate placed at the space of about two inches from
the front plate, contracting gradually over the top of the Caboose, &
terminating by a flue or pipe of six inches which receives an elbow at top
The space at the back of the oven is occupied by the boiler, the bottom
which is within two inches of the middle plate, the top of the boiler
which lines with the top of the oven receives two perforated strainers which
occupy the whole inside space of the Caboose and causes any victuals
being laid thereon to be cooked by the steam from the boiler.
The whole Caboose has a lid or cover, which cover has a smaller
aperture in the centre stopped by a lid, for the purpose of looking in
at pleasure.

John Bovis

Witnesses
William Thornton
Geo: Lyon

351 [illegible]

Drawing made
[illegible]